United States Patent
Imthurn et al.

(10) Patent No.: US 11,277,677 B1
(45) Date of Patent: Mar. 15, 2022

(54) OPTICALLY POWERED SWITCH AND METHOD FOR OPERATING AN OPTICALLY POWERED SWITCH

(71) Applicant: QUALCOMM Incorporated, San Diego, CA (US)

(72) Inventors: George Pete Imthurn, San Diego, CA (US); Ravi Pramod Kumar Vedula, San Diego, CA (US); Stephen Alan Fanelli, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/117,940

(22) Filed: Dec. 10, 2020

(51) Int. Cl.
  *H04Q 11/00* (2006.01)
(52) U.S. Cl.
  CPC . *H04Q 11/0005* (2013.01); *H04Q 2011/0007* (2013.01)
(58) Field of Classification Search
  CPC ........ H03K 17/78; H03K 17/79; H01L 31/16; H05K 1/181; H04Q 11/0005; H04Q 2011/0007
  USPC .......................................................... 398/45
  See application file for complete search history.

(56) References Cited

U.S. PATENT DOCUMENTS

| | | | |
|---|---|---|---|
| 4,939,482 A * | 7/1990 | Nergaard | H04B 10/502 332/183 |
| 6,037,602 A | 3/2000 | Polce | |
| 7,956,314 B1 * | 6/2011 | Landt | H03F 3/085 250/214 SW |
| 2005/0173619 A1 * | 8/2005 | Berg | H01H 59/0009 250/214.1 |
| 2006/0133436 A1 * | 6/2006 | Nishiyama | H04B 10/807 372/38.04 |
| 2010/0237227 A1 * | 9/2010 | Koste | H03K 17/941 250/206 |
| 2016/0341921 A1 * | 11/2016 | Belansky | H04B 10/807 |
| 2017/0093501 A1 | 3/2017 | Meitl et al. | |
| 2019/0222211 A1 * | 7/2019 | Yang | H05K 1/181 |

* cited by examiner

*Primary Examiner* — Dalzid E Singh
(74) *Attorney, Agent, or Firm* — Patterson + Sheridan, LLP (57) ABSTRACT

An optically powered switch. An example optically powered switch generally includes a light source configured to output an optical signal. The example optically powered switch generally includes a photodiode configured to convert the optical signal to an electrical signal. The example optically powered switch generally includes a bias and control circuit configured to power at least one radio frequency (RF) switch using the electrical signal.

16 Claims, 5 Drawing Sheets

OPTICALLY POWERED SWITCH AND METHOD FOR OPERATING AN OPTICALLY POWERED SWITCH

BACKGROUND

Field of the Disclosure

Certain aspects of the present disclosure generally relate to electronic circuits and, more particularly, to an optically powered switch.

Description of Related Art

A continued emphasis in semiconductor technology is to create improved performance semiconductor devices at competitive prices. This emphasis over the years has resulted in extreme miniaturization of semiconductor devices, made possible by continued advances in semiconductor processes and materials in combination with new and sophisticated device designs. Many of the semiconductor devices that are contemporaneously being created are aimed at processing digital data. There are, however, also numerous semiconductor designs that are aimed at incorporating analog functions into devices that simultaneously process digital and analog signals, or devices that can be used for the processing of only analog signals.

An example of a semiconductor device that may incorporate analog and digital functions is a radio frequency front-end. A wireless communication device, such as a base station or a user equipment, may include a radio frequency front-end for transmitting and/or receiving radio frequency signals. The radio frequency front-end may include transistors to implement various analog and digital devices, such as control circuitry, switches, duplexers, diplexers, multiplexers, power amplifiers, low noise amplifiers, mixers, etc. The devices implemented with transistors may be fabricated on one or more semiconductor wafers. Some of the transistor devices (such as a power amplifier) may be fabricated as discrete components and interconnected to the other devices of the radio frequency front-end.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include an improved radio frequency front-end with reduced loss for a wireless communication device.

Certain aspects of the present disclosure provide an optically powered switch. The optically powered switch device generally includes a light source configured to output an optical signal. The optically powered switch device generally includes a photodiode optically coupled to the light source and configured to convert the optical signal to an electrical signal. The optically powered switch device generally includes a bias and control circuit electrically coupled to the photodiode and configured to power at least one radio frequency (RF) switch using the electrical signal.

Certain aspects of the present disclosure provide a method for operating an optically powered switch. The method generally includes generating an optical signal. The method generally includes converting the optical signal to an electrical signal. The method generally includes powering at least one radio frequency (RF) switch using the electrical signal.

Certain aspects of the present disclosure provide an apparatus having an optically powered switch. The apparatus generally includes means for generating an optical signal. The apparatus generally includes means for converting the optical signal to an electrical signal. The apparatus generally includes means for powering at least one radio frequency (RF) switch using the electrical signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Aspects of the present disclosure generally relate to a radio frequency (RF) switch, such as an optically powered switch and methods and apparatus for operating an optically powered switch.

Solid-state RF switches may have an undesirable resistive path to ground that can cause a reduction in power radiated from the antenna. Aspects of the present disclosure provide an optically powered switch. Use of an optically powered switch may increase parasitic resistance and decrease parasitic capacitance to ground seen by the switch (e.g., as compared to a conventional solid-state RF switch). The optically powered switch may be smaller, cost less, and/or use less power (e.g., as compared to a micro-electro-mechanical system (MEMS) RF switch).

Example RF Front-End

A radio frequency (RF) front-end typically includes electronic components such as control logic, switches, digital circuits, low noise amplifiers (LNAs), power amplifiers (PAs), etc. These electronic components may be assembled as discrete elements on a laminate substrate such as a glass-reinforced epoxy laminate (e.g., FR4) substrate. As will be discussed in more detail herein, the discrete components on the radio frequency (RF) front-end may lead to undesirable parasitic resistances, inductances, and/or capacitances, resulting in significant parasitic losses. These losses could occur, for example, in 5G New Radio wireless access bands (such as sub-6 GHz (e.g., 450-6000 MHz) bands and/or mmWave bands (e.g., 24-30 GHz)).

Figure 1:
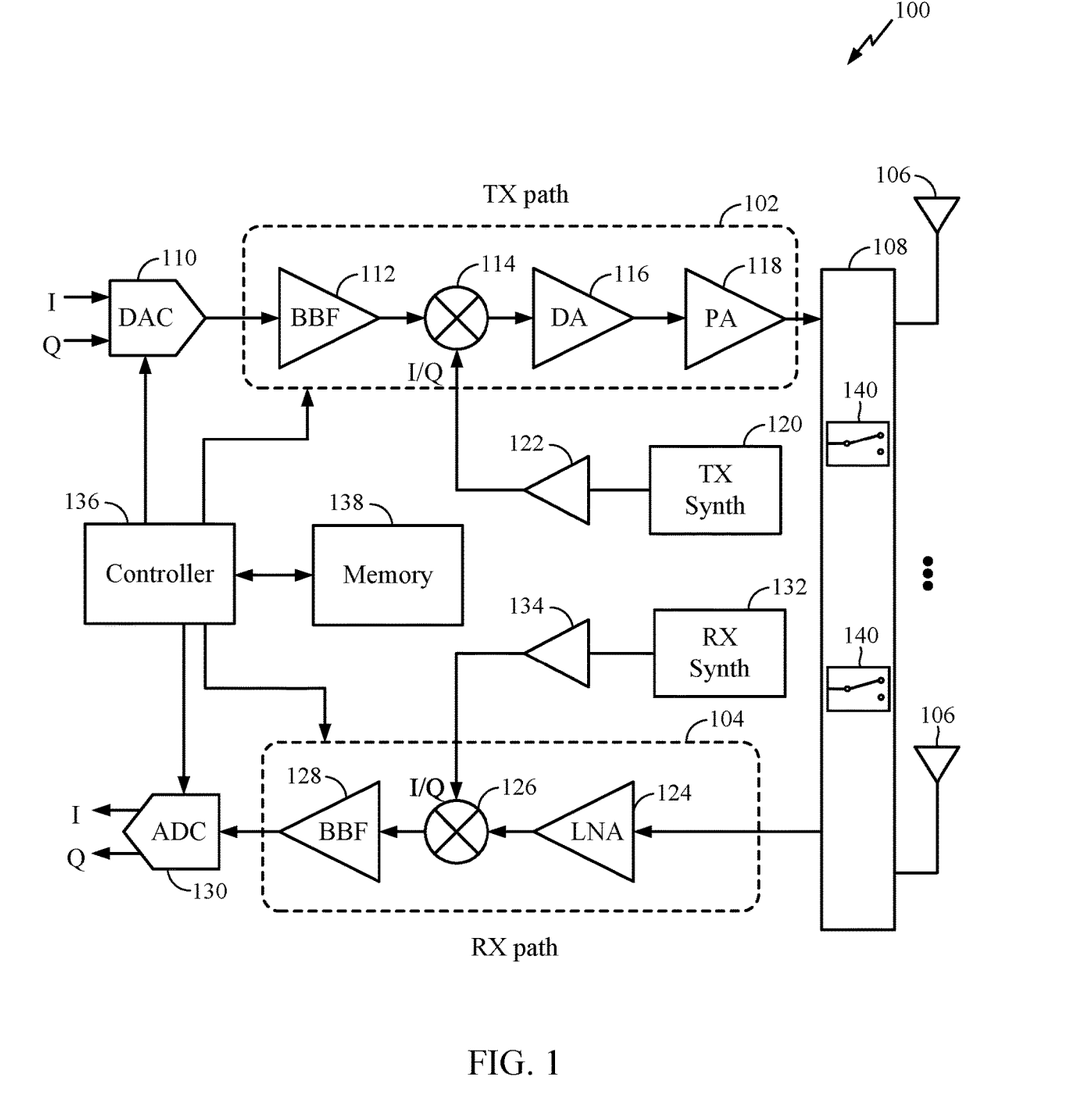
FIG. 1 is a block diagram showing an example radio frequency (RF) front-end, in accordance with certain aspects of the present disclosure.

FIG. 1 is a block diagram of an example RF front-end 100, in accordance with certain aspects of the present disclosure.

The RF front-end 100 includes at least one transmit (TX) path 102 (also known as a transmit chain) for transmitting signals via one or more antennas 106 and at least one receive (RX) path 104 (also known as a receive chain) for receiving signals via the antennas 106. When the TX path 102 and the RX path 104 share an antenna 106, the paths may be connected with the antenna via an interface 108, which may include any of various suitable RF devices, such as a switch 140, a duplexer, a diplexer, a multiplexer, and the like. In certain aspects, one or more switches 140 may be included in other components, such as a tunable capacitor array for a tunable filter or a frequency synthesizer, used in the RF front-end 100.

Receiving in-phase (I) or quadrature (Q) baseband analog signals from a digital-to-analog converter (DAC) 110, the TX path 102 may include a baseband filter (BBF) 112, a mixer 114, a driver amplifier (DA) 116, and a power amplifier (PA) 118. The BBF 112, the mixer 114, the DA 116, and the PA 118 may be included in a semiconductor device such as a radio frequency integrated circuit (RFIC).

The BBF 112 filters the baseband signals received from the DAC 110, and the mixer 114 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 114 are typically RF signals, which may be amplified by the DA 116 and/or by the PA 118 before transmission by the antenna 106.

The RX path 104 may include a low noise amplifier (LNA) 124, a mixer 126, and a baseband filter (BBF) 128. The LNA 124, the mixer 126, and the BBF 128 may be included in a RFIC, which may or may not be the same RFIC that includes the TX path components. RF signals received via the antenna 106 may be amplified by the LNA 124, and the mixer 126 mixes the amplified RF signals with a receive local oscillator (LO) signal to convert the RF signal of interest to a different baseband frequency (e.g., downconvert). The baseband signals output by the mixer 126 may be filtered by the BBF 128 before being converted by an analog-to-digital converter (ADC) 130 to digital I or Q signals for digital signal processing.

While it is desirable for the output of an LO to remain stable in frequency, tuning to different frequencies indicates using a variable-frequency oscillator, which may involve compromises between stability and tunability. Some systems may employ frequency synthesizers with a voltage-controlled oscillator (VCO) to generate a stable, tunable LO with a particular tuning range. Thus, the transmit LO may be produced by a TX frequency synthesizer 120, which may be buffered or amplified by amplifier 122 before being mixed with the baseband signals in the mixer 114. Similarly, the receive LO may be produced by an RX frequency synthesizer 132, which may be buffered or amplified by amplifier 134 before being mixed with the RF signals in the mixer 126.

A controller 136 may direct the operation of the RF front-end 100, such as transmitting signals via the TX path 102 and/or receiving signals via the RX path 104. The controller 136 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 138 may store data and program codes for operating the RF front-end 100. The controller 136 and/or memory 138 may include control logic (e.g., CMOS logic).

While FIG. 1 provides an RF front-end as an example application in which certain aspects of the present disclosure may be implemented to facilitate understanding, certain aspects described herein related to an optically powered switch may be utilized in any of various other suitable electronic systems.

As mentioned, an RF front-end (e.g., such as RF front-end 100) may include RF switches (e.g., one or more switches 140). In some examples, solid-state RF switches are used.

Solid-state RF switches may experience insertion loss that may be due to switch resistance (e.g., transistor on-resistance). Insertion loss may refer to the loss of signal power resulting from insertion of a device in a transmission line and can be expressed in decibels (dB). For example, an RF switch may experience insertion loss from insertion in an RF front-end.

Figure 2:
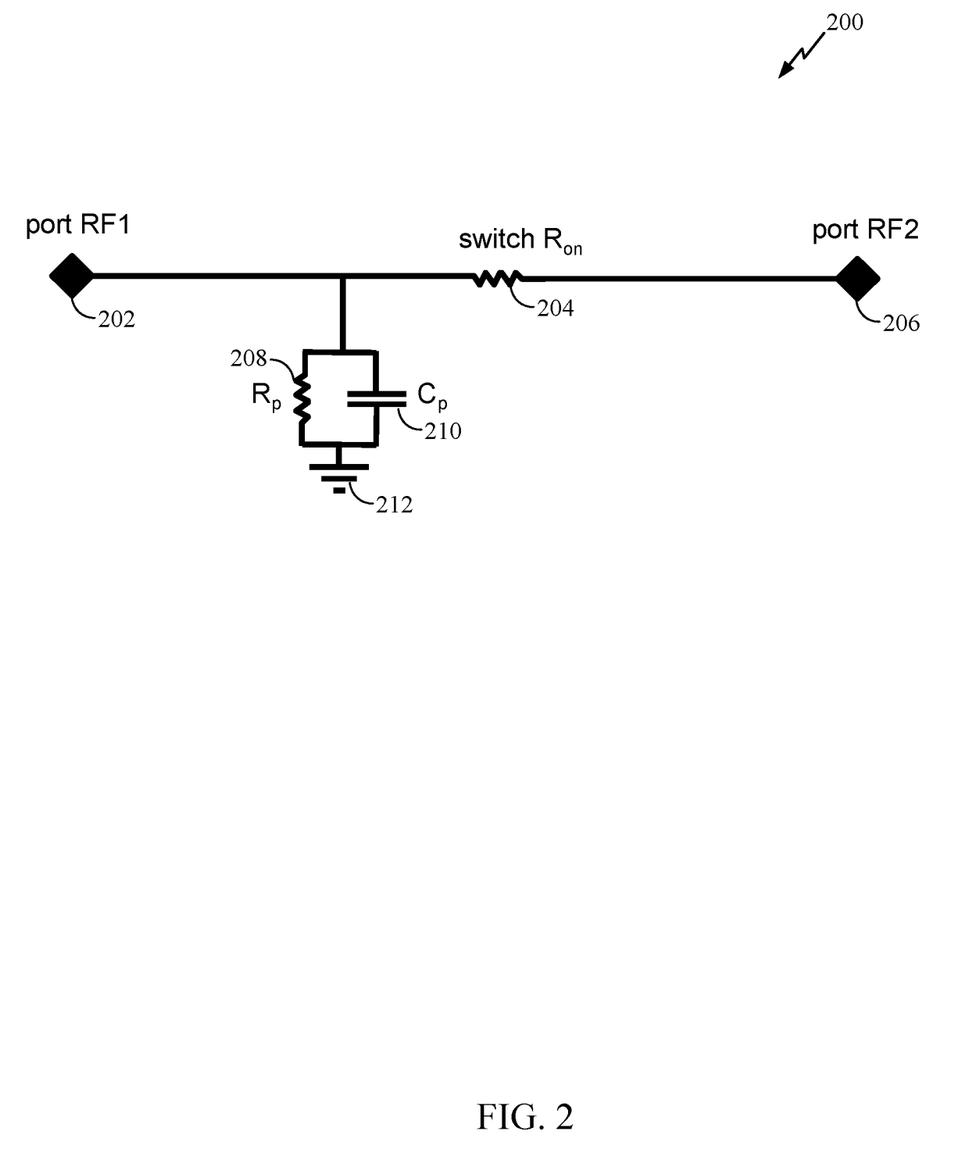
FIG. 2 is a schematic diagram modeling components of an example RF switch, including parasitic components, in accordance with certain aspects of the present disclosure.

Solid-state RF switches may have a dissipative resistive path to ground. FIG. 2 is a schematic diagram modeling components of an example solid-state RF switch 200. As shown in FIG. 2, the solid-state RF switch 200 includes a first RF port 202, a series resistive element 204 (modeling the switch on-resistance), a second RF port 206, a parasitic resistive element 208 with parasitic resistance $R_p$, and a parasitic capacitive element 210 with parasitic capacitance $C_p$. Solid-state RF switches may lose RF power to ground 212 through these parallel parasitic elements 208, 210. A number of loss paths may be represented by the parasitic elements 208, 210. A source of the resistive path(s) to ground may be due to a biasing for gates (e.g., metal-oxide-semiconductor field-effect transistor (MOSFET) gates) of the RF switch transistors. For example, a gate bias network through a power supply (e.g., an alternating current (AC) ground) may couple to a substrate and a seal ring for the device.

The resistive path to ground can cause a reduction in power radiated from an antenna (e.g., one or more antennas 106). The resistive path to ground may lead to a higher insertion loss (e.g., higher than the loss due to the expected Rory of the switch transistors).

In some cases, resistor values in the gate biasing network can be increased (e.g., adding resistors of around 250 kΩ to 1 MΩ in series with the gate) to reduce dissipative loss; however, increasing resistor values can increase the switch time of the RF switch transistors. Thus, increasing resistor values may be limited to a specified switch time limit.

RF switches made from Micro-Electro-Mechanical Systems (MEMS) may experience little to no resistive path to ground because the coupling from the signal line to the control circuit is small. A MEMS RF switch may use physical movement to contact a cantilever beam with signal pads. MEMS-based RF switches have high parasitic resistance to ground, but are large and more expensive than solid-state RF switches.

Therefore, an RF switch that can be electrically isolated from ground, to reduce insertion loss, and that can be smaller and less costly than a MEMS RF switch, are desirable.

Example Optically Powered Switch

According to certain aspects, an optically powered switch is provided. Use of an optically powered switch may reduce or eliminate parasitic losses due to a dissipative resistive path to ground. For example, an optically powered switch may remove (e.g., not include) electrical connection of a gate bias network to ground. Instead, an optical connection can be used, which may help to isolate a radio frequency (RF) switch. In some examples, an optically powered switch may be used in an RF front-end, such as the RF front-end 100 illustrated in FIG. 1. An optically powered switch can be used in, but is not limited to, an antenna tuner, impedance tuner, or other component in an RF front-end.

Figure 3:
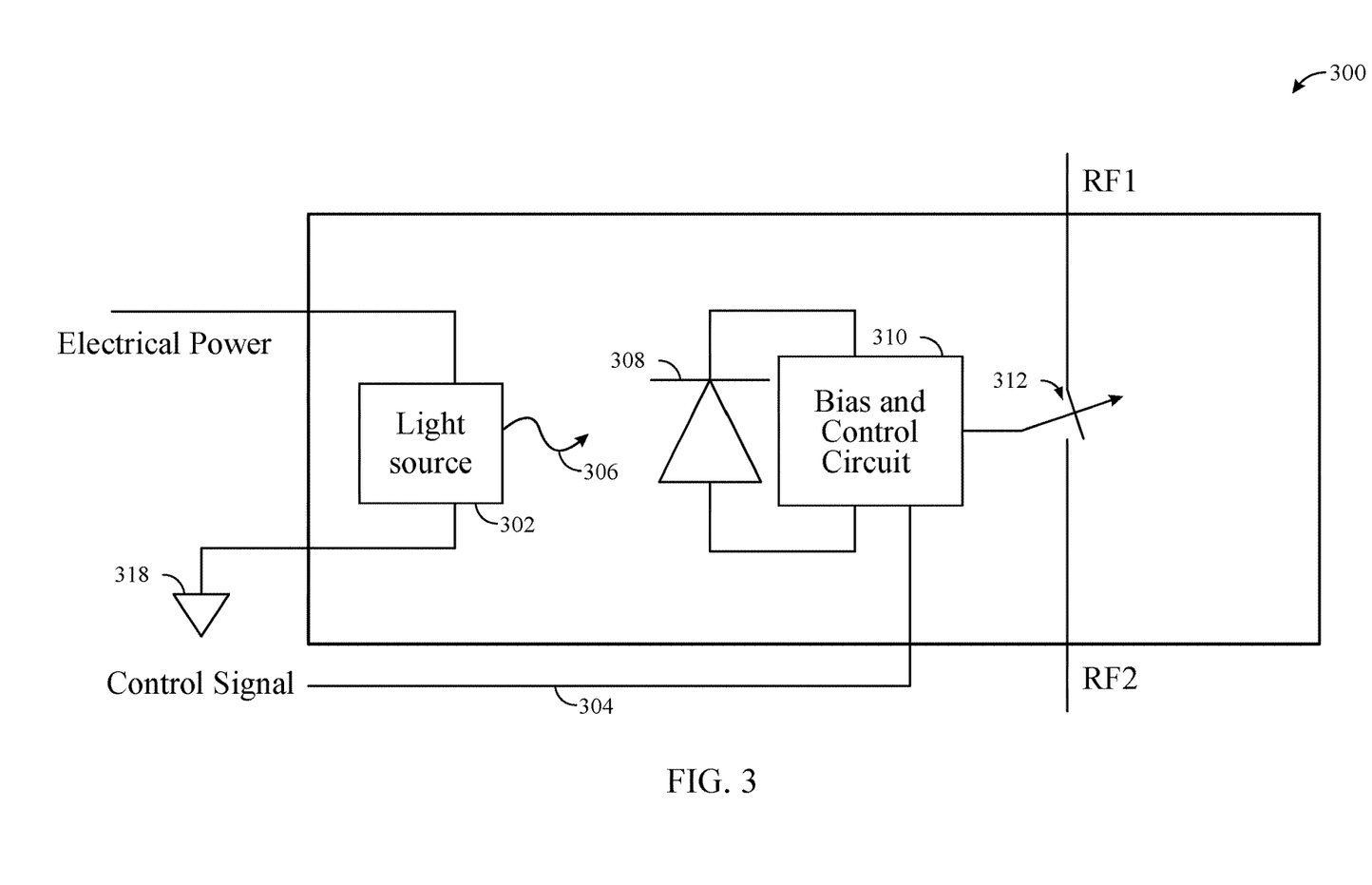
FIG. 3 is an example block diagram of an optically powered switch, in accordance with certain aspects of the present disclosure.

FIG. 3 is an example block diagram of an optically powered switch 300, in accordance with certain aspects of the present disclosure. As shown in FIG. 3, the example optically powered switch 300 includes a light source 302, a photodiode 308, a bias and control circuit 310, and an RF switch 312. The light source 302 and photodiode 308 can be used to effectively optically power the RF switch 312 when light is provided by the light source 302 to the photodiode 308.

The light source 302, photodiode 308, and RF switch 312 can be integrated in a single module or on separate modules (e.g., same or separate chips/substrates). The light source 302, photodiode 308, and/or RF switch 312 may be integrated on the same semiconductor substrate, fabricated as part of a layer transfer process, or joined together in another manner of microelectronics packaging. The bias and control circuit 310 may most likely be on the chip (semiconductor substrate) with the RF switch 312.

As shown in FIG. 3, the light source 302 receives electrical power (e.g., from a power source/supply voltage). For example, the light source 302 may receive current from a power source, such as a battery, or from a voltage regulator, such as a low-dropout (LDO) regulator or a switched-mode power supply (SMPS). The light source 302 can also be coupled to ground 318. As shown in FIG. 3, however, the light source 302 and the photodiode 308 are electrically isolated from each other. In some examples, the light source 302 may be a diode, such as a light-emitting diode (LED), an LED portion of an optocoupler, or a laser diode. For example, the light source 302 may receive electrical power and generate an optical signal 306 for reception by the photodiode 308. The light source 302 may provide the optical signal 306 to the photodiode 308 via emitted light (e.g., by putting the light source 302 in proximity to the photodiode 308), an optical fiber, or another type of optical waveguide. For optical fiber delivery of the optical signal 306, the end of the optical fiber may be polished at an angle, may have a grating, and/or may be attached perpendicular to the photodiode 308. The optical waveguide (or optical fiber) may have a single-mode core or a multi-mode core.

The photodiode 308 and/or the light source 302 (when implemented as a LED) may be any semiconductor material that can be doped to form a p-n junction. For example, the photodiode 308 and/or the light source 302 may be made of silicon (Si), gallium arsenide (GaAs), gallium arsenide phosphide (GaAsP), indium arsenide (InAs), gallium nitride (GaN), aluminum gallium nitride (AlGaN), a polycrystalline semiconductor material (e.g., polysilicon), and the like. The wavelength(s) of the light generated by the light source 302 and delivered to the photodiode 308 may be based on the material of the photodiode 308. For example, the wavelength(s) of the light may be selected such that the photodiode 308 can absorb the wavelength(s). In an example, for a silicon photodiode, a red laser diode may be used as the light source 302. A polycrystalline semiconductor photodiode 308 (and/or for the light source 302) may be used to reduce or avoid RF power loss and harmonic generation. A high resistivity material may be used for the photodiode 308 (and/or for the light source 302) to increase efficiency and avoid interference with RF signals.

A single photodiode 308 may be used to generate a direct current (DC) voltage and that generated DC voltage may be converted to another DC voltage. For example, the generated DC voltage may be converted to a target DC voltage (e.g., a desired or required DC voltage) for the RF switch 312. If the RF switch 312 and photodiode 308 are on separate semiconductor substrates, the generated DC voltage may be converted to the target DC voltage on the same semiconductor substrate as the photodiode 308 or on the same semiconductor substrate as the RF switch 312.

In some aspects, the size of the photodiode 308 may be varied to increase or decrease the total available electrical charge. In some aspects, an array of photodiodes coupled in series may be used to increase or decrease the voltage supplied to the RF switch 312. The array of photodiodes can be arranged to supply positive or negative voltage. Both voltage polarities, positive and negative, can be supplied simultaneously by connecting a reference voltage line at a tap in a plurality of series-connected photodiodes.

The photodiode 308 may be coupled to the RF switch 312 and may power the RF switch 312. The photodiode 308 may convert the optical signal 306 to an electrical signal. The electrical signal may be used to power the RF switch 312. The RF switch 312 may be a solid-state RF switch. The RF switch 312 may be opened or closed using the power from the electrical signal. In some examples, the photodiode 308 provides up to around 0.75 mW of optical power to the RF switch 312. In some examples, the light source 302 is a vertical-cavity surface-emitting laser (VCSEL). An example VCSEL may provide the optical power using an electrical input of 3.6 mA and 2.5 V. An example VCSEL may have a 2.5 V bias voltage, 40Ω resistance, 2.5 mA threshold current, 3.57 mA VCSEL current, and provide 0.75 mW optical power to the RF switch 312, while the input electrical power to the VCSEL may be around 9 mW.

In some aspects, the photodiode 308 may power multiple RF switches (e.g., multiple RF switches in series).

As shown in FIG. 3, the optically powered switch 300 can include a bias and control circuit 310. The bias and control circuit 310 may be operated based on an input control signal 304. The bias and control circuit 310 may control the RF switch 312 via an output control signal. In some aspects, the bias and control circuit 310 does not include an alternating current (AC) ground connection. For example, because the power supply, the light source 302, and ground 318 have an optical connection to the bias and control circuit 310, rather than an electrical connection, the bias and control circuit 310 is electrically isolated from the connection to ground 318.

Figure 4:
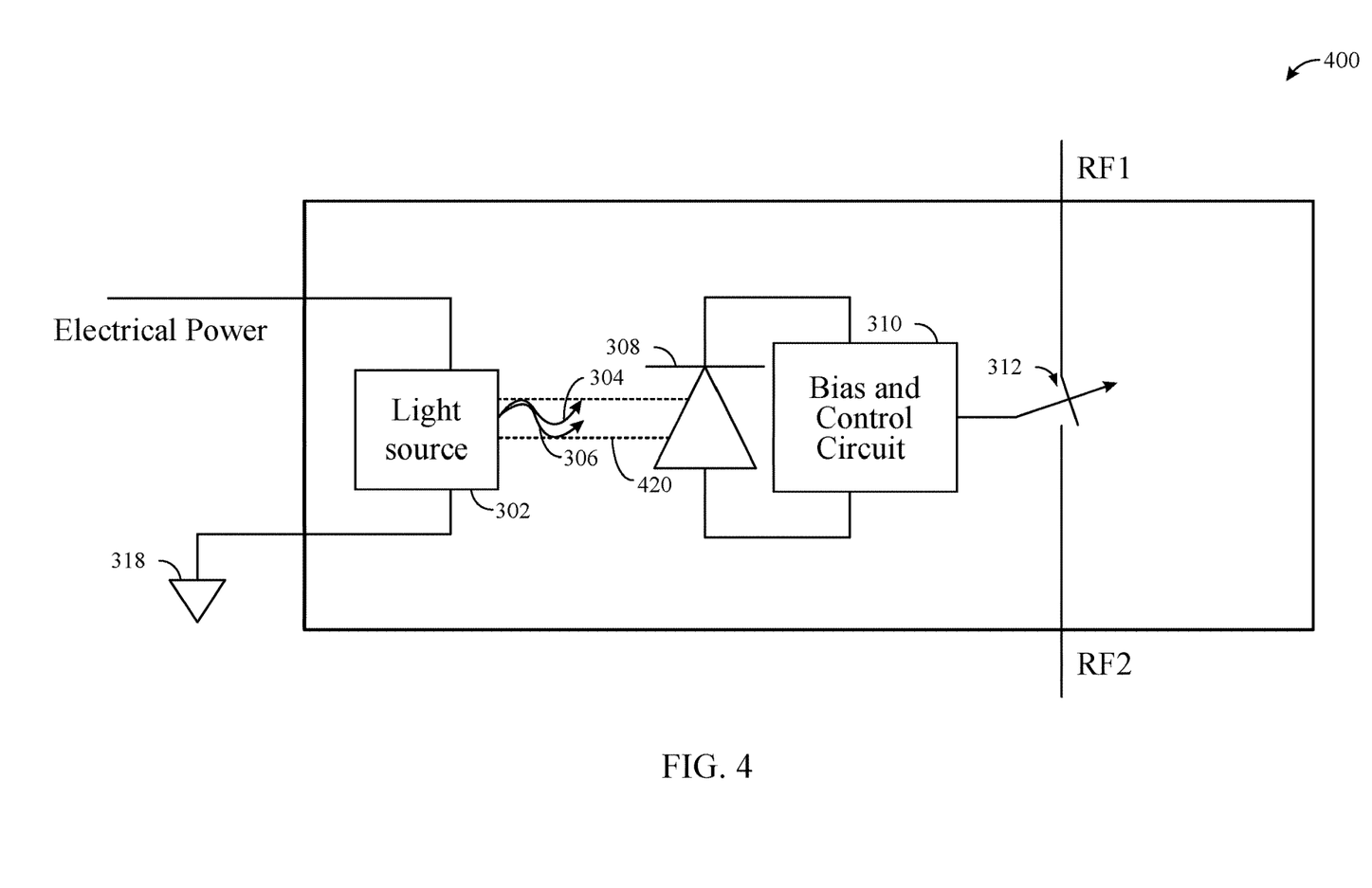
FIG. 4 is an example block diagram of an optically powered switch implemented with an optical waveguide, in accordance with certain aspects of the present disclosure.

In the example shown in FIG. 3, the control signal 304 is sent separately from the optical signal 306. In some examples, the control signal 304 may be sent with the optical signal 306 in an optical waveguide 420 (e.g., an optical fiber), as shown in the example optically powered switch 400 illustrated in FIG. 4. Sending the control signal 304 with the optical signal 306 may remove another resistive path for the RF signal. In an example, the control signal 304 for the RF switch 312 may be sent via the optical waveguide with the optical signal 306. For certain aspects, the control signal 304 may be modulated on the optical signal 306. Alternatively, the control signal 304 may be sent using a different wavelength than the optical signal 306 and separated at the photodiode 308 through a diffraction grating or any other method to separate wavelengths.

In some aspects, the optical signal 306 provides power to the RF switch 312, but does not control the RF switch 312 (e.g., does not control the RF switch 312 to open or close). In some cases, the optical signal 306 both provides the power to the RF switch 312 and also controls the operation of the RF switch 312. In some aspects, the photodiode 308 can store a charge from the optical signal 306. This way, the photodiode 308 can use the stored charge to power the RF switch 312 even when the optical signal 306 is not present.

In some aspects, the RF switch 312 is in a standby mode listening for a command. The RF switch 312 may use power as soon as the RF switch gets a command. In some aspects, the optically powered switch 300 starts the optical signal to provide power to charge up the RF switch 312 so the RF switch 312 can wait for the state command to change state (e.g., on/off, open/close).

Figure 5:
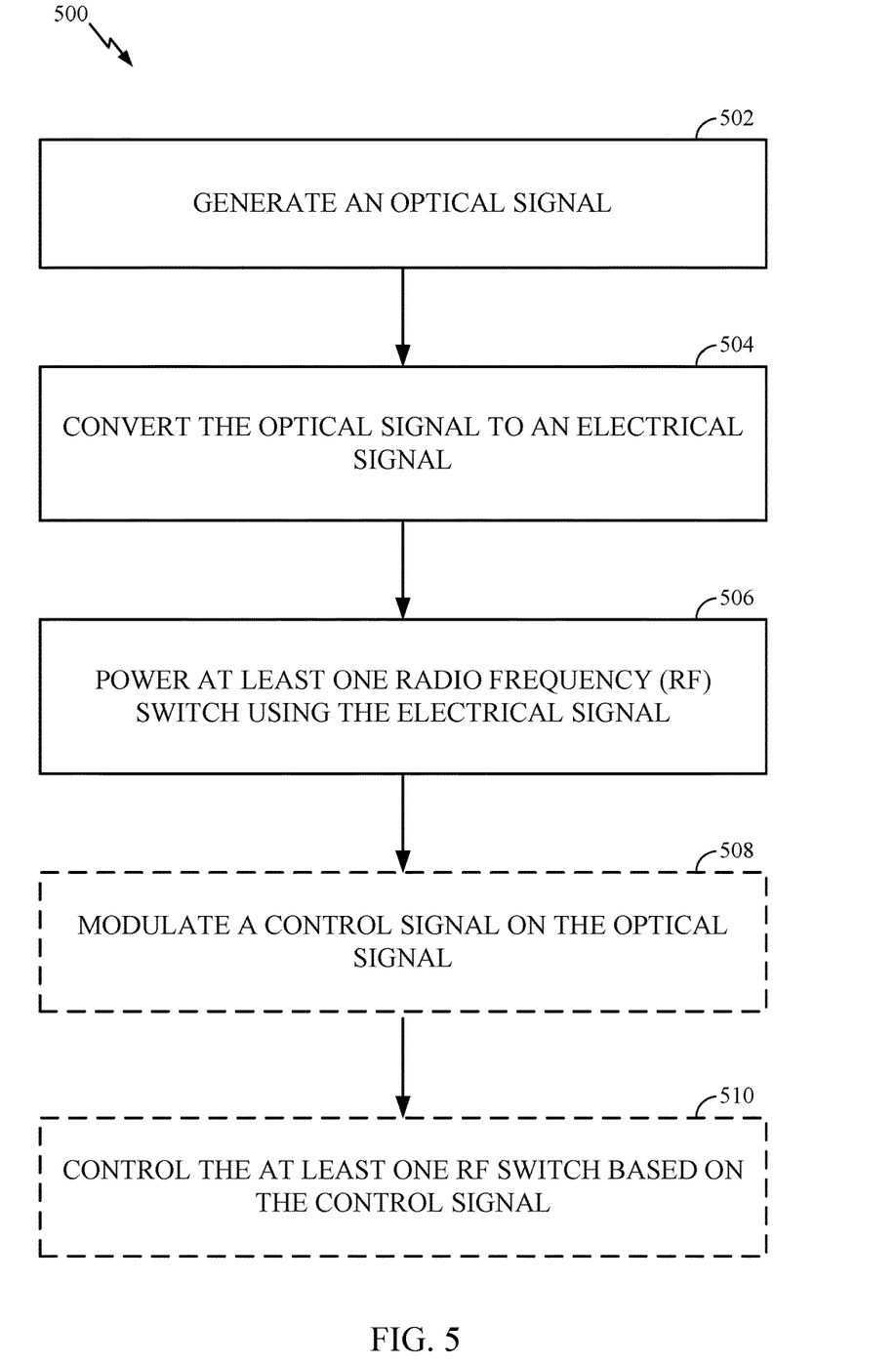
FIG. 5 is a flow diagram of an example process for operating an optically powered switch, in accordance with certain aspects of the present disclosure.

FIG. 5 is a flow diagram of example operations 500 for operating an optically powered switch (e.g., the optically powered switch 300 of FIG. 3 and/or the optically powered switch 400 of FIG. 4), in accordance with certain aspects of the present disclosure. The operations 500 may be performed at an RF front-end (e.g., the RF-front end of FIG. 1), such as in a modem which may be in a wireless communications device, such as a user equipment (UE), wireless access point, and/or base station (BS).

The operations 500 may begin, at block 502, by generating an optical signal. For example, the optical signal can be generated at a light source (e.g., such as the light source 302) based on power from a power source. The optical signal (e.g., such as the optical signal 306) can be provided to a photodiode (e.g., such as the photodiode 308). The optical signal can be provided via emitted light, an optical fiber, or another optical waveguide (e.g., such as the optical waveguide 420).

The operations 500 include, at block 504, converting the optical signal to an electrical signal. For example, a photodiode that receives the optical signal can convert the optical power to electrical power.

The operations 500 include, at block 506, powering at least one RF switch using the electrical signal. For example, the photodiode can provide the electrical signal to the RF switch (e.g., such as the RF switch 312) to power the RF switch. In some aspects, the RF switch is controlled based on a control signal (e.g., such as the control signal 304). The control signal may be provided to a bias and control circuit (e.g., such as the bias and control circuit 310). The bias and control circuit may operate the RF switch based on the control signal. The control signal may be provided via a separate connection from the optical signal. In some aspects, the operations 500 optionally include, at block 508, modulating a control signal on the optical signal. The operations 500 optionally include, at block 510, controlling the at least one RF switch based on the control signal. In some aspects, the control signal is sent with the optical signal, but at a different wavelength than the optical signal. The RF switch may operate by opening/closing (turning off/on) based on control from the bias and control circuit and using the power provided by the photodiode.

Use of an optically powered switch may increase the parasitic resistance, $R_p$, and may decrease the parasitic capacitance, $C_p$, to ground seen by the RF switch. For example, using an optically powered switch improves the $R_p$ and $C_p$ as compared to a standard solid-state RF switch by optically coupling the power and ground to the RF switch, instead of providing an electrical connection. In addition, an optically powered switch may be smaller, cost less, and use less power than a MEMS switch. A MEMS switch may use a high voltage supply, while an optically powered switch can be powered using a relatively lower voltage. An optically powered switch may also provide better electrostatic discharge (ESD) protection than a MEMS switch, because the optically powered switch uses an optical connection instead of an electrical connection.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components.

In some examples, means for generating an optical signal may include a light source (e.g., such as the light source 302), such as by a laser diode, LED, or LED portion of an optocoupler. In some examples, means for converting the optical signal to an electrical signal may include a photodiode (e.g., such as the photodiode 308) or a photodiode portion or phototransistor portion of an optocoupler. In some examples, the means for generating and the means for converting may be combined into an optocoupler. In some examples, means for powering at least one RF switch using the electrical signal includes a bias and control circuit (e.g., such as the bias and control circuit 310). In some examples, the means for powering at least one RF switch using the electrical signal may be combined with the means for converting the optical signal to an electrical signal.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. An optically powered switch, comprising:
   a light source configured to output an optical signal;
   a photodiode optically coupled to the light source and configured to convert the optical signal to an electrical signal;
   a bias and control circuit electrically coupled to the photodiode and configured to power at least one radio frequency (RF) switch using the electrical signal; and
   an optical waveguide configured to couple the optical signal from the light source to the photodiode, wherein the bias and control circuit is configured to:
      receive a control signal via the optical waveguide; and
      control the at least one RF switch based on the control signal.

2. The optically powered switch of claim 1, wherein the bias and control circuit is electrically isolated from an alternating current (AC) to ground connection.

3. The optically powered switch of claim 1, wherein the optical waveguide comprises an optical fiber.

4. The optically powered switch of claim 3, wherein the optical fiber is polished at an angle, has a grating, or is at least partially perpendicular to the photodiode.

5. The optically powered switch of claim 1, wherein the bias and control circuit is configured to receive the control signal modulated onto the optical signal or to receive the control signal at a different wavelength than the optical signal.

6. The optically powered switch of claim 1, wherein the optical signal comprises emitted light from the light source.

7. The optically powered switch of claim 1, wherein the light source comprises a diode.

8. The optically powered switch of claim 1, wherein the photodiode comprises at least one of: a high resistivity material, silicon, a polycrystalline semiconductor material, or a semiconductor material doped to form a p-n junction.

9. The optically powered switch of claim 1, wherein the photodiode and the at least one RF switch are on a same semiconductor substrate.

10. The optically powered switch of claim 1, wherein the photodiode and the at least one RF switch are on separate semiconductor substrates.

11. The optically powered switch of claim 1, wherein:
   the electrical signal from the photodiode comprises a first direct current (DC) voltage;
   the bias and control circuit further comprises circuitry to convert the first DC voltage to a second DC voltage; and
   the second DC voltage is used to activate the at least one RF switch.

12. The optically powered switch of claim 11, wherein the circuitry comprises an array of photodiodes coupled in series.

13. The optically powered switch of claim 12, wherein the array of photodiodes supply positive voltage, negative voltage, or both positive and negative voltages concurrently with a reference voltage line coupled to a tap in the array of photodiodes.

14. The optically powered switch of claim 1, wherein:
   the electrical signal is stored at a first time; and
   the stored electrical signal is used to activate the at least one RF switch at a second time.

15. A method for operating an optically powered switch, comprising:
   generating an optical signal;
   converting the optical signal to an electrical signal;
   powering at least one radio frequency (RF) switch using the electrical signal;
   modulating a control signal on the optical signal; and
   controlling the at least one RF switch based on the control signal.

16. An apparatus having an optically powered switch, comprising:
   means for generating an optical signal;
   means for converting the optical signal to an electrical signal;
   means for powering at least one radio frequency (RF) switch using the electrical signal;
   means for modulating a control signal on the optical signal; and
   means for controlling the at least one RF switch based on the control signal.

* * * * *